US006446498B1

(12) United States Patent
Schricker et al.

(10) Patent No.: US 6,446,498 B1
(45) Date of Patent: Sep. 10, 2002

(54) METHOD FOR DETERMINING A CONDITION OF AN EXHAUST GAS RECIRCULATION (EGR) SYSTEM FOR AN INTERNAL COMBUSTION ENGINE

(75) Inventors: David R. Schricker, Dunlap; Thomas R. Sandborg, Mapleton; Steven R. McCoy, Washington, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/343,915

(22) Filed: Jun. 30, 1999

(51) Int. Cl.[7] ............................................ G01M 15/00
(52) U.S. Cl. ................................................... 73/118.1
(58) Field of Search ............................... 73/116, 117.2, 73/117.3, 118.1

(56) References Cited

U.S. PATENT DOCUMENTS

| | | | | |
|---|---|---|---|---|
| 4,870,941 A | | 10/1989 | Hisatomi | 123/571 |
| 4,870,942 A | | 10/1989 | Shibata et al. | 123/571 |
| 4,967,717 A | | 11/1990 | Miyazaki et al. | 123/571 |
| 4,974,572 A | * | 12/1990 | Aramaki | |
| 5,209,212 A | * | 5/1993 | Viess et al. | 73/117.2 |
| 5,377,112 A | | 12/1994 | Brown et al. | 364/431.12 |
| 5,520,161 A | | 5/1996 | Klopp | 123/676 |
| 5,601,068 A | | 2/1997 | Nozaki | 123/676 |
| 5,611,204 A | | 3/1997 | Radovanovic et al. | 60/605.2 |
| 5,621,167 A | | 4/1997 | Fang-Cheng | 73/118.1 |
| 5,727,533 A | | 3/1998 | Bidner et al. | 123/571 |
| 5,802,846 A | | 9/1998 | Bailey | 60/278 |
| 6,085,732 A | * | 7/2000 | Wang et al. | |

FOREIGN PATENT DOCUMENTS

| | | | |
|---|---|---|---|
| DE | 4319380 A1 | 12/1993 | F02M/25/07 |

OTHER PUBLICATIONS

Cooled EGR—A Key Technology for Future Efficient HD Diesels—Copyright 1998 Society of Automotive Engineers, Inc.

* cited by examiner

*Primary Examiner*—Eric S. McCall
(74) *Attorney, Agent, or Firm*—Steve D. Lundquist

(57) ABSTRACT

A method for determining a condition of an exhaust gas recirculation (EGR) system for an internal combustion engine. The method includes the steps of setting an EGR valve located on the EGR system to a first position, determining a first temperature value at a location on the EGR system, setting the EGR valve to a second position, determining a second temperature value at the location, and determining a condition of the EGR system as a function of the difference between the first and second temperature values.

21 Claims, 5 Drawing Sheets

METHOD FOR DETERMINING A CONDITION OF AN EXHAUST GAS RECIRCULATION (EGR) SYSTEM FOR AN INTERNAL COMBUSTION ENGINE

TECHNICAL FIELD

This invention relates generally to a method for determining a condition of an exhaust gas recirculation (EGR) system and, more particularly, to a method for determining a condition of an EGR system as a function of at least one temperature.

BACKGROUND ART

Exhaust gas recirculation is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The exhaust gas recirculation technique primarily involves the recirculation of exhaust gas by-products into the intake air supply of the internal combustion engine. This exhaust gas thus reintroduced into the engine cylinder reduces the concentration of oxygen therein, which in turn lowers the maximum combustion temperature within the cylinder and slows the chemical reaction of the combustion process, decreasing the formation of nitrous oxide. Furthermore, the exhaust gases typically contain a portion of unburned hydrocarbon which is burned on its reintroduction into the engine cylinder, which further reduces the emission of exhaust gas by-products which would be emitted as undesirable pollutants from the internal combustion engine.

It is important that the EGR system functions properly at all times, thus reducing the emission of these undesirable by-products into the atmosphere, and allowing the internal combustion engine to operate at peak efficiency. Attempts have been made, with some limited degree of success, to monitor conditions of EGR systems to determine proper operation of the system. For example, in U.S. Pat. No. 5,727,533, Bidner et al. disclose a method and apparatus, using a temperature sensor at the intake manifold of an internal combustion engine, to monitor the temperature of the combined air and EGR gases as they enter the cylinders. In U.S. Pat. No. 4,967,717, Miyazaki et al. use a temperature sensor at the intake manifold and an additional temperature sensor at the air intake passage of the engine to compare the change in temperature from the air intake to the intake manifold, i.e., before and after the EGR gases are introduced into the air stream. In U.S. Pat. No. 4,870,941, Hisatomi uses a temperature sensor located in the EGR passage upstream of the EGR valve to determine the temperature of the exhaust gases prior to entering the EGR valve. Each of these attempts to monitor the condition of an EGR system are limited to those systems used for small engines; that is, the EGR systems are relatively simple in that they do not require the addition of cooling systems or air pressure compensation such as would be needed on larger diesel engines.

When utilizing EGR in a turbocharged diesel engine, the exhaust gas to be recirculated is preferably removed upstream of the exhaust gas driven turbine associated with the turbocharger. In many EGR applications, the exhaust gas is diverted directly from the exhaust manifold. Likewise, the recirculated exhaust gas is preferably re-introduced to the intake air stream downstream of the compressor and air-to-air aftercooler. Reintroducing the exhaust gas downstream of the compressor and air-to-air aftercooler is preferred due to the reliability and maintainability concerns that arise should the exhaust gas be passed through the compressor and aftercooler. However, at some engine operating conditions, there is a pressure differential between the intake manifold and the exhaust manifold which essentially prevents many conventional EGR systems from being utilized. For example, at high speed, high load conditions in a turbocharged engine, the exhaust gas does not readily flow from the exhaust manifold to the intake manifold.

With the increased complexity of EGR systems on larger diesel engines, including engines with turbochargers, proper operation of the EGR system is even more important. However, monitoring the condition of the EGR system becomes more complex and difficult with the additional components required for the system.

The present invention is directed to overcoming one or more of the problems as set forth above.

DISCLOSURE OF THE INVENTION

In one aspect of the present invention a method for determining a condition of an exhaust gas recirculation (EGR) system for an internal combustion engine is disclosed. The method includes the steps of setting an EGR valve located on the EGR system to a first position, determining a first temperature value at a location on the EGR system, setting the EGR valve to a second position, determining a second temperature value at the location, and determining a condition of the EGR system as a function of the difference between the first and second temperature values.

In another aspect of the present invention a method for determining a condition of an exhaust gas recirculation (EGR) system for an internal combustion engine is disclosed. The method includes the steps of holding an EGR valve located on the EGR system at an open position, setting a cold side valve located on the EGR system to a first position, determining a first temperature value at a location on the EGR system, setting the cold side valve to a second position, determining a second temperature value at the location, and determining a condition of the EGR system as a function of the difference between the first and second temperature values.

In yet another aspect of the present invention a method for determining a flow coefficient of an exhaust gas recirculation (EGR) system for an internal combustion engine having at least one cylinder, an intake manifold, and an exhaust manifold is disclosed. The method includes the steps of determining a percent of EGR (%EGR) being recirculated as a function of temperatures at the intake and exhaust manifolds, determining a mass airflow through the cylinder, determining a mass airflow through an EGR valve located in the EGR system, determining a manifold pressure differential between the intake manifold and the exhaust manifold, and determining the EGR flow coefficient as a function of the mass airflow through the EGR valve and the manifold pressure differential.

BEST MODE FOR CARRYING OUT THE INVENTION

Figure 1:
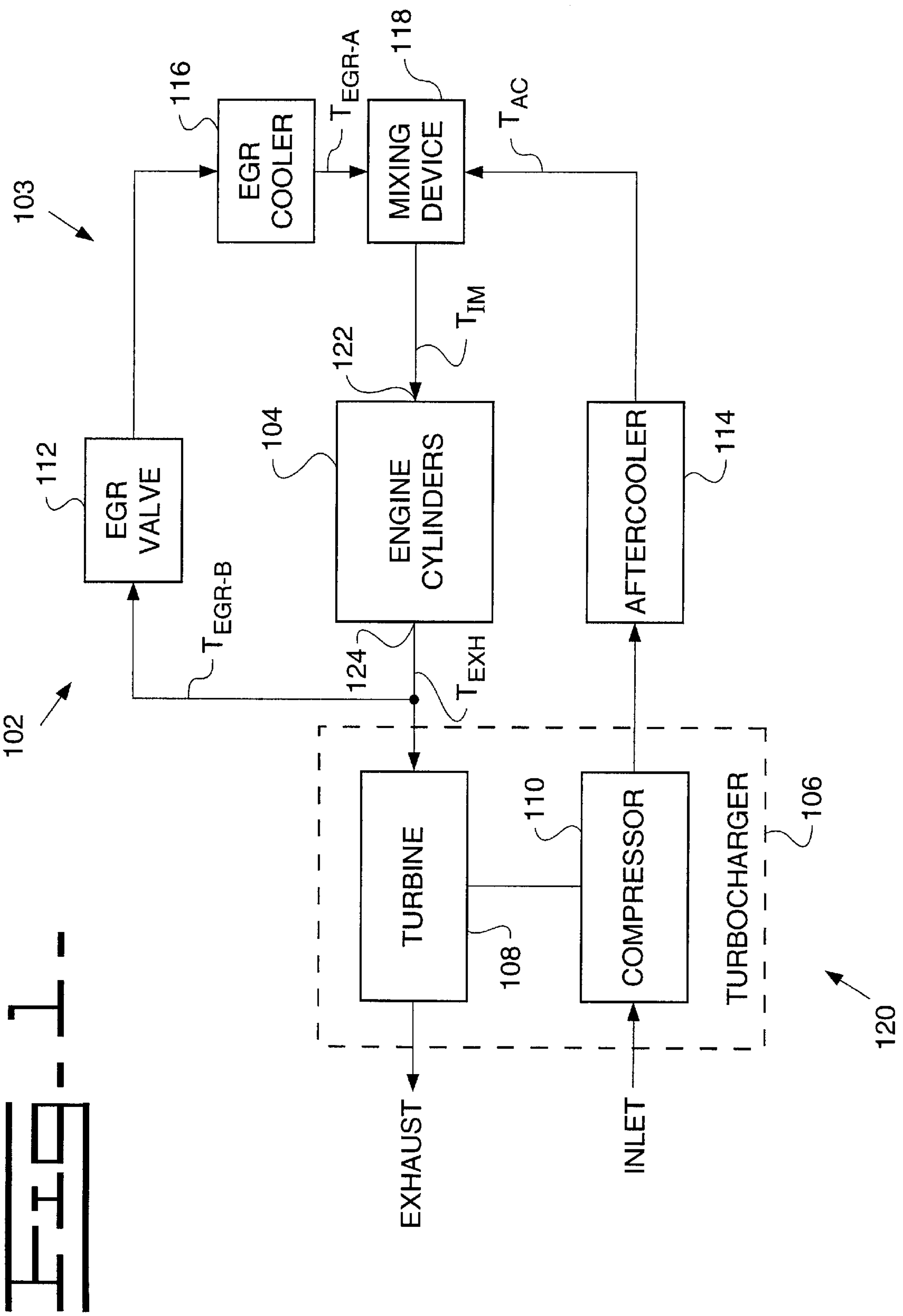
FIG. 1 is a diagrammatic illustration of an embodiment of the present invention.

Referring to the drawings, and with particular reference to FIG. 1, a diagrammatic illustration of an embodiment of the present invention is disclosed.

An internal combustion engine 102 is used to provide power for applications such as propelling a mobile machine or supplying electrical power. In the preferred embodiment of the present invention, the engine 102 is a medium or large duty diesel engine, used to provide power to a mobile machine. However, other types of engines, e.g., small diesel engines, gasoline engines, and the like, may benefit from an application of the present invention.

The engine 102 includes at least one cylinder 104, preferably a plurality of cylinders 104, such as 6, 8, 12, and the like. Hereinafter, reference to the term cylinder 104 refers to one or more cylinders 104 in the engine 102.

An exhaust gas recirculation (EGR) system 103 is connected to the engine 102 in a manner that recirculates a portion of the exhaust gases through the cylinders 104, thus reducing undesired emissions from the engine 102. EGR systems are well known in the art. Therefore, a detailed discussion of the principles of the EGR system will not be given.

The EGR system 103 includes an EGR valve 112 to control the amount of exhaust gases recirculated to the engine 102. Typically, the EGR valve 112 functions by preventing the recirculation of exhaust gases when the EGR valve 112 is closed, and allowing the recirculation of gases as the EGR valve 112 opens. The EGR system 103 may include more than one EGR valve 112, such as with a larger engine 102 which might have more than one EGR valve 112 to control the recirculation of gases from more than one exhaust path. For purposes of discussion of the present invention, however, it will be assumed that the EGR system 103 has one EGR valve 112.

A fresh air/exhaust gas mixing device 118 combines the exhaust gases from the EGR valve 112 with fresh air from an air intake system 120. The mixing device 118 may be of a variety of configurations known in the art. For example, the mixing device 118 may include a mixing portion and a pump (not shown), configured as a venturi mixing device. Alternatively, the mixing device 118 may have a mixing portion and a pump may be separately used, thus providing a configuration of a blower. Mixing devices are well known in the art, and therefore, for purposes of discussion of the present invention, reference will be made to a mixing device 118 in a generic sense.

Preferably, with medium and large diesel engines, an EGR cooler 116 is located in the EGR system 103 to cool the recirculated exhaust gases to a desired temperature range before being mixed with the intake air. This feature is important in larger, heavy duty diesel engines, where the temperature of the exhaust gas may be high enough to damage the engine 102.

The air intake system 120 may be of a variety of configurations commonly used to provide fresh air to the cylinders 104. However, in medium and large, heavy duty diesel engines 102, as exemplified for use with the present invention, it is common to use an air intake system 120 which includes a turbocharger 106. A typical turbocharger 106 includes a turbine 108 which turns as a result of exhaust gases passing through the turbine 108. The turbine 108, in turn, is linked to a compressor 110, and drives the compressor 110 such that fresh air is forced into the turbocharger 106 for delivery to the cylinders 104. The compressed intake air generally requires cooling, which is accomplished by an aftercooler 114 located between the compressor 110 and the mixing device 118.

Figure 2:
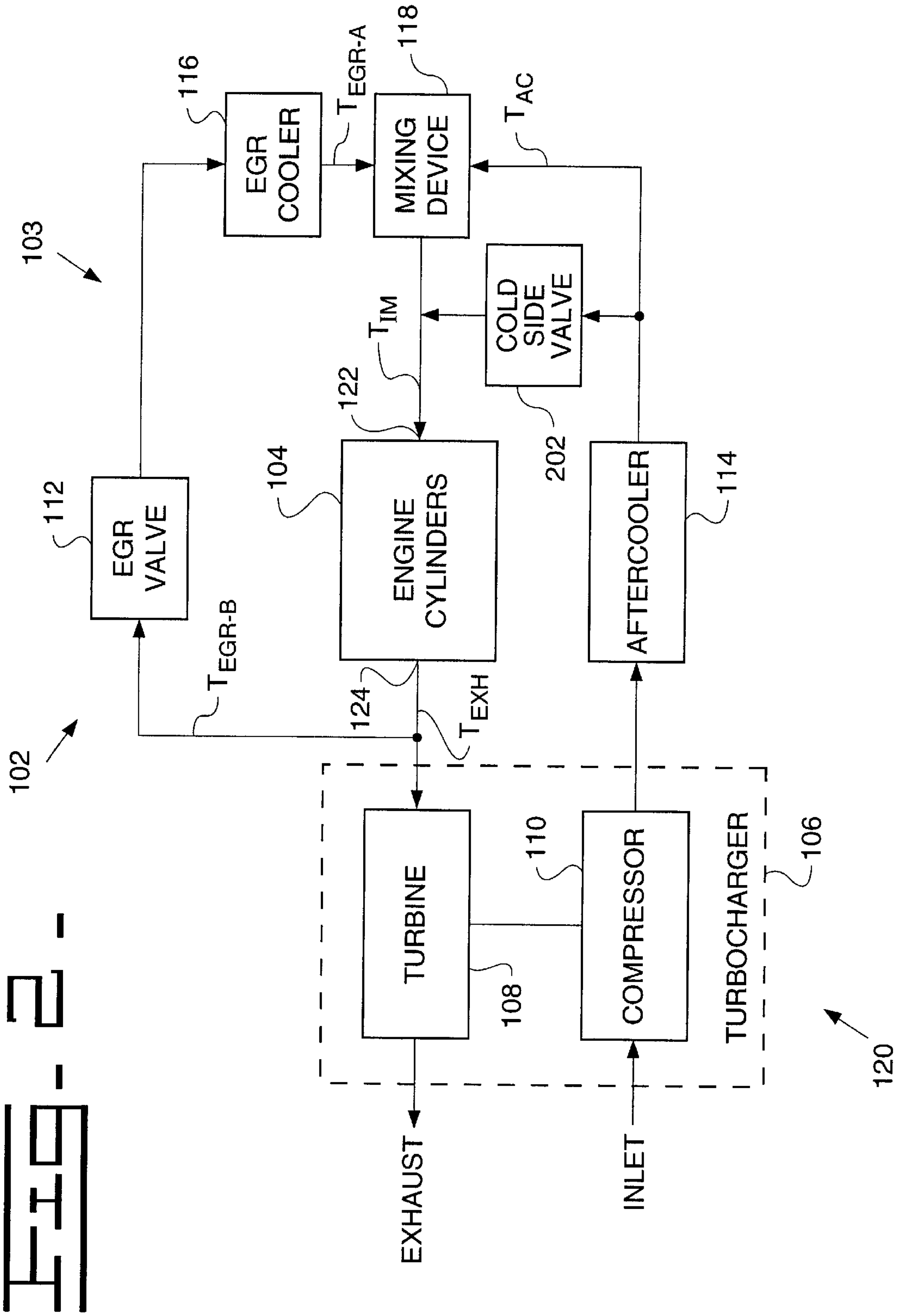
FIG. 2 is a diagrammatic illustration of another embodiment of the present invention.

Referring now to FIG. 2, a diagrammatic illustration of an alternate embodiment of the present invention is shown. A cold side valve 202 is added to the embodiment depicted in FIG. 1 to provide additional control of the EGR system 103. The cold side valve 202 is located on the intake side of the engine 102, and is preferably used with a venturi type mixing device 118, the cold side valve being separated from the throat of the venturi-type mixing device 118 by a predetermined distance.

The embodiments illustrated in FIGS. 1 and 2 are exemplary of the configurations available for EGR systems in medium and large duty diesel engines. It is noted that variations of these embodiments may benefit from use of the present invention as well.

Figure 3:
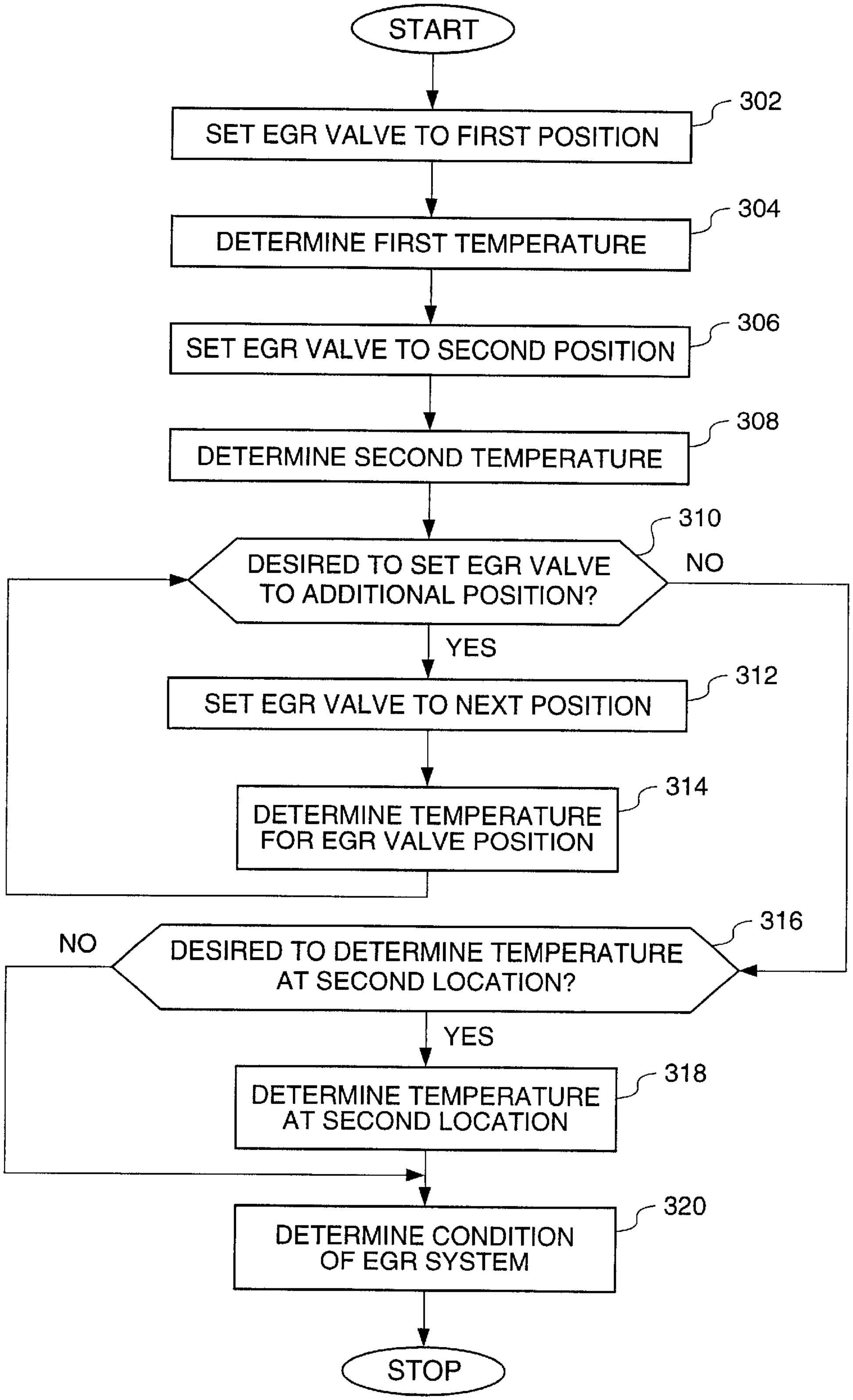
FIG. 3 is a flow diagram illustrating one aspect of the present invention.
Figure 4:
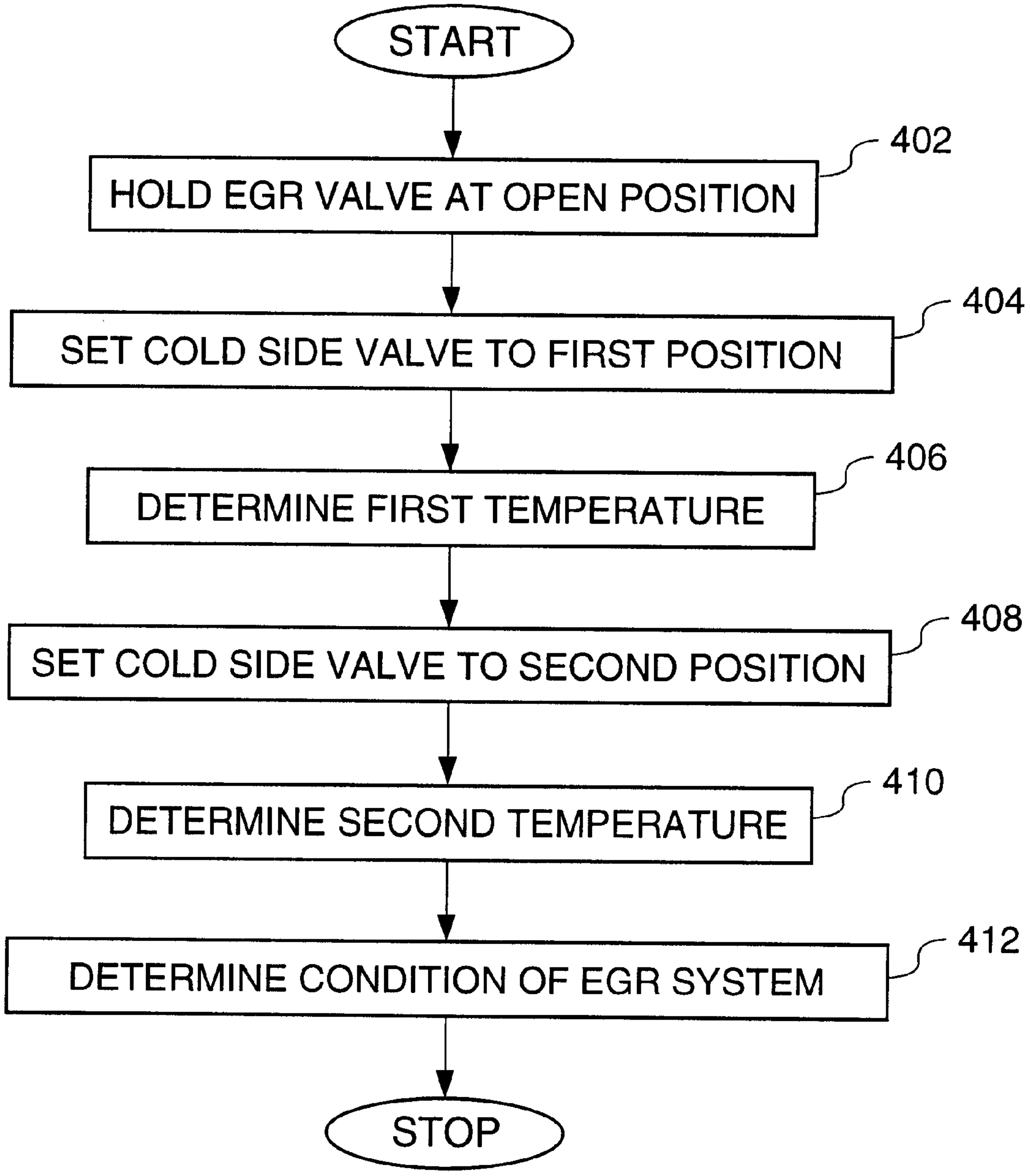
FIG. 4 is a flow diagram illustrating another aspect of the present invention.
Figure 5:
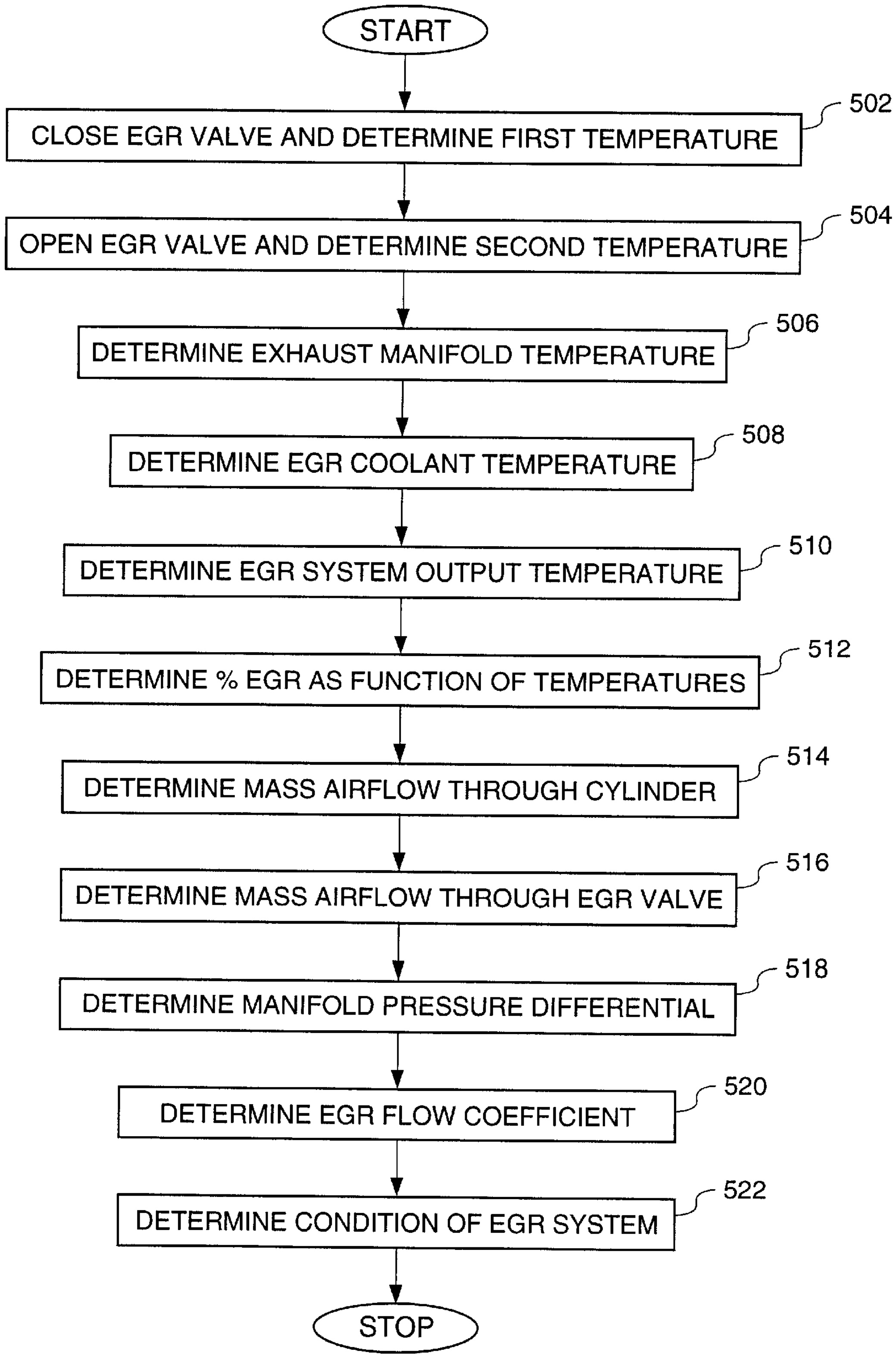
FIG. 5 is a flow diagram illustrating yet another aspect of the present invention.

Referring to FIGS. 3, 4, and 5, while maintaining continued reference to FIGS. 1 and 2, flow diagrams are shown which illustrate aspects of the present invention.

With specific reference to FIG. 3, in a first control block 302, the EGR valve 112 is set to a first position. Preferably, the first predetermined position of the EGR valve is a closed position, i.e., no exhaust gas is allowed to recirculate to the cylinders 104.

In a second control block 304, a first temperature value is determined at a first predetermined location on the engine 102. Preferably, the first predetermined location is at an intake manifold 122 located on the engine 102. The temperature at the intake manifold 122 is shown as $T_{IM}$ in FIGS. 1 and 2. Preferably, the temperature $T_{IM}$ is sensed, using a suitable type sensor known in the art.

In a third control block 306, the EGR valve 112 is set to a second position, preferably at an open position to allow exhaust gas to recirculate into the cylinders 104. After allowing a brief period of time for conditions to settle to steady state, i.e., for temperatures to stabilize, a second temperature value is determined at $T_{IM}$, as shown in a fourth control block 308.

Control then proceeds to a first decision block 310, where it is determined if it is desired to set the EGR valve 112 to an additional position. If it is determined not to set the EGR valve 112 to an additional position, control proceeds to a second decision block 316, where it is determined if it is desired to determine the temperature at a second location. If it is determined not to determine the temperature at a second location, control proceeds to an eighth control block 320.

In the eighth control block 320, the condition of the EGR system 103 is determined based on the difference in temperature at the first predetermined location for the two EGR valve settings. In the preferred embodiment, the condition of the EGR system 103 is determined to be normal if the temperature at the intake manifold 122 increases as the EGR valve 112 is changed from a closed position to an open position.

In one embodiment of the present invention, control in FIG. 3 may move directly from the fourth control block 308 to the eighth control block 320. The control and decision blocks between the fourth control block 308 and the eighth control block 320 would not exist.

Referring back to the first decision block 310, if it is desired to set the EGR valve 112 to an additional position, control then proceeds to a fifth control block 312, where the EGR valve 112 is set to another position. Then, in a sixth control block 314, the temperature at the first predetermined location is determined for that setting of the EGR valve 112. Control then returns to the first decision block 310, and loops through the fifth and sixth control blocks 312, 314 for as many settings of the EGR valve 112 as desired. In this embodiment of the present invention, a range of temperature settings for various incremental positions of the EGR valve 112 is determined. This range of temperatures may be compared to a reference range of temperature settings to determine the condition of the EGR system 103, i.e., in the eighth control block 320, with enhanced accuracy.

Referring back to the second decision block 316, if it is desired to determine the temperature at a second location, control then proceeds to a seventh control block 318, where the temperature is determined at the second location for each desired setting of the EGR valve 112. For example, the temperature, $T_{AC}$, may be determined between the after-cooler 114 and the mixing device 118. This temperature, i.e., the temperature of the fresh air entering the mixing device 118, allows for determination of the condition of the EGR system 103 under conditions that are less constrained than if only one temperature location was monitored, since the temperature determined only at the intake manifold 122 must be used to determine the fresh air temperature, i.e., with the EGR valve 112 closed, and the combined fresh air/exhaust gas temperature, i.e., when the EGR valve 112 is open.

It is noted that the three embodiments described with respect to FIG. 3 may be employed together, separately, or in any combination without deviating from the intent of the present invention. In addition, variations of these embodiments, e.g., the locations of the temperature determinations and the like, may be employed in the present invention.

Referring now to FIG. 4, and with reference to FIG. 2, an alternate embodiment of the present invention is disclosed. This alternate embodiment may be used with an EGR system 103 having a cold side valve 202, as described above.

In a first control block 402, the EGR valve 112 is held open at a predetermined position, for example, in a normal open operating position. However, any desired position may be chosen in which to hold the EGR valve 112.

In a second control block 404, the cold side valve 202 is set to a first desired position. For example, the first desired position of the cold side valve 202 may be a closed position. A first temperature is then determined in a third control block 406. Preferably, the temperature is determined at the first predetermined position, i.e., at the intake manifold 122.

Control then proceeds to a fourth control block 408, where the cold side valve 202 is set to a second desired position, preferably a predetermined open position. In a fifth control block 410, a second temperature is determined in response to the cold side valve 202 being set to the second desired position.

In a sixth control block 412, the first and second temperatures are compared to determine the condition of the EGR system 103. For example, if the mixing device 118 operates as a venturi type device, i.e., includes a pump, the temperature should decrease as the cold side valve 202 is opened, since the amount of fresh air going through the mixing device 118 would reduce the amount of exhaust gas coming to the mixing device 118.

It is noted that additional temperatures may be determined for additional settings of the cold side valve 202 to obtain a range of temperatures similar to the embodiment described above with respect to the EGR valve 112.

Referring now to FIG. 5, another embodiment of the present invention is disclosed. In a first control block 502, the EGR valve 112 is closed and a first temperature is determined. Preferably, the temperature is determined at the intake manifold 122. In a second control block 504, the EGR valve 112 is opened and a second temperature is determined.

Control then proceeds to a third control block 506, where the temperature at the exhaust manifold 124 is determined. The temperature at the exhaust manifold, $T_{EXH}$, may be sensed or modeled using various engine operating parameters. Modeling of engine exhaust temperature is known in the art. For example, in U.S. Pat. No. 5,377,112, a method for modeling exhaust temperature is disclosed.

In a fourth control block 508, the temperature of coolant, $T_{COOL}$, located in the EGR cooler 116 is determined. For example, if the coolant is a liquid coolant that is part of the engine coolant system, the temperature of the coolant may be determined at some point prior to entering the EGR cooler 116. If the EGR cooler 116 operates by air passing through it, the ambient air temperature may be determined.

In a fifth control block 510, the EGR system output temperature, $T_{EGR\text{-}A}$, is determined, preferably either with a sensor or by use of the equation:

$$T_{EGR\text{-}A}=T_{EXH}-\eta(T_{EXH}-T_{COOL}) \qquad \text{(Equation 1)}$$

where $\eta$ is the assumed efficiency of the EGR cooler 116.

In a sixth control block 512, the percent EGR (%EGR) as a function of the above temperatures is determined. In the preferred embodiment, the %EGR is determined by the equation:

$$\%\ EGR = \frac{T_{IM2} - T_{IM1}}{T_{EGR-A} - T_{IM1}} \qquad \text{(Equation 2)}$$

where $T_{IM1}$ and $T_{IM2}$ are the first and second temperature determinations, respectively, at the intake manifold 122.

In a seventh control block 514, the mass airflow through the cylinder 104 is determined, preferably by the equation:

$$\dot{m}_{cyl} = \rho_{IM} \times VE \times \frac{DISP}{2} \times \frac{\text{rpm}}{60} \qquad \text{(Equation 3)}$$

where $\dot{m}_{cyl}$ is the mass airflow through the cylinder 104, $\rho_{IM}$ is the density of air at the intake manifold 122, VE is the volumetric pumping efficiency of the engine, expressed as a function of the engine speed and the fuel position, DISP is the displaced volume of the cylinder 104 and is divided by 2 to account for every 2 strokes of the cylinder 104, and rpm divided by 60 is revolutions per second of the engine 102.

In an eighth control block 516, the mass airflow through the EGR valve 112 is determined, preferably by multiplying the mass airflow through the cylinder, $\dot{m}_{cyl}$, by the %EGR.

Control then proceeds to a ninth control block 518, where the pressure differential between the intake manifold 122 and the exhaust manifold 124 is determined. In one embodiment of the present invention, the pressure differential is determined by measuring the pressure at the intake manifold 122, i.e., the boost pressure, determining the pressure at the exhaust manifold 124 by some means known in the art, e.g., measuring or modeling, and calculating the pressure differential. In another embodiment of the present invention, the pressure at the intake manifold 122 may be measured, and the pressure differential may be directly determined as a function of the engine speed and fuel position, i.e., rack position of a fuel injector (not shown) located on the engine 102.

In a tenth control block 520, an EGR flow coefficient is determined by the equation:

$$K = \frac{\dot{m}_{EGR}}{\sqrt{\Delta P_{MAN}}} \quad \text{(Equation 4)}$$

where K is the EGR flow coefficient, $\dot{m}_{EGR}$ is the mass airflow through the EGR valve, and $\Delta P_{MAN}$ is the manifold pressure differential.

The EGR flow coefficient may be used for a variety of purposes. For example, in a twelfth control block 522, the flow coefficient is used to determine a condition of the EGR system 103, perhaps by reference to a map of expected flow coefficient values. As another example, a table may be created with electrical current values for operation of the EGR valve 112 and flow coefficient values to determine the flow coefficient needed to control the EGR valve 112 for the desired flow of exhaust gas. As the EGR flow coefficient is determined, the desired current value to apply to the EGR valve 112 is known from the table to control the EGR valve to the desired setting.

Industrial Applicability

Emissions standards of internal combustion engines, in particular diesel engines, are becoming more stringent. Exhaust gas recirculation, performed by EGR systems of various configurations, provides an effective means to reduce the emissions of exhaust pollutants from an engine. Methods have been devised to check the operations of EGR systems to insure proper performance. However, as the diesel engines increase in size and loading, the EGR systems must be made more complex to function properly. For example, temperatures of air and exhaust gas exceed recommended operating levels, and intake and exhaust pressures often differ enough to impede normal EGR operation without additional components. These complex EGR systems require more complex methods to monitor performance and insure proper operation. The present invention is directed toward resolving these issues of complexity.

Other aspects, objects, and features of the present invention can be obtained from a study of the drawings, the disclosure, and the appended claims.

What is claimed is:

1. A method for determining a condition of an exhaust gas recirculation (EGR) system for an internal combustion engine, including the steps of:

setting an EGR valve located on the EGR system to a first predetermined position;

determining a responsive first temperature value at a first predetermined location;

setting the EGR valve to a second predetermined position;

determining a responsive second temperature value at the first predetermined location;

setting the EGR valve to a third predetermined position;

determining a responsive third temperature value at the first predetermined location; and determining a condition of the EGR system as a function of differences between the first, second and third temperature values.

2. A method, as set forth in claim 1, further including the steps of:

setting the EGR valve to a plurality of additional predetermined positions;

determining a responsive temperature value at the first predetermined location for each of the plurality of additional predetermined positions;

determining a range of temperature values as a function of the temperature values at the predetermined positions; and further determining the condition of the EGR system as a function of the range of temperature values.

3. A method, as set forth in claim 2, wherein the first predetermined position of the EGR valve is in a closed position.

4. A method, as set forth in claim 3, wherein each of the second and additional predetermined positions of the EGR valve are at incremental open positions.

5. A method, as set forth in claim 2, wherein the first predetermined location for determining each temperature value is at an intake manifold located on the internal combustion engine.

6. A method, as set forth in claim 5, further including the steps of:

determining a temperature value at a second predetermined location; and further determining a condition of the EGR system as a function of a comparison between the temperature values at the first and second predetermined locations for each predetermined position of the EGR valve.

7. A method, as set forth in claim 6, wherein the second predetermined location for determining a temperature value is at an inlet for fresh air located prior to a fresh air/exhaust gas mixing device located on the EGR system.

8. A method, as set forth in claim 2, further including the steps of:

holding the EGR valve at one of the second and additional predetermined positions;

setting a cold side valve located on the EGR system to a first predetermined position;

determining a responsive first temperature value at the first predetermined location;

setting the cold side valve to a second predetermined position;

determining a responsive second temperature value at the first predetermined location; and determining a further condition of the EGR system as a function of the difference between the first and second temperature values.

9. A method, as set forth in claim 5, further including the steps of:

determining a percent of EGR (%EGR) being recirculated as a function of a temperature value at the first predetermined location and a temperature value at a third predetermined location;

determining a mass airflow through a cylinder located in the engine;

determining a mass airflow through the EGR valve as a function of the mass airflow through the cylinder and the %EGR;

determining a manifold differential pressure between the intake manifold and an exhaust manifold located on the engine; and determining an EGR flow coefficient as a function of the mass airflow through the EGR valve and the manifold pressure differential.

10. A method, as set forth in claim 9, further including the step of determining a condition of the EGR system as a function of the EGR flow coefficient.

11. A method, as set forth in claim 9, wherein the third predetermined location for determining a temperature value is at the exhaust manifold.

12. A method, as set forth in claim 9, wherein determining a %EGR includes the steps of:

closing the EGR valve and responsively determining the first temperature value at the first predetermined location;

opening the EGR valve to a desired position and responsively determining the second temperature value at the first predetermined location;

determining the temperature value at the exhaust manifold;

determining an EGR coolant temperature value at an EGR cooler located in the EGR system;

determining an EGR system output temperature as a function of the exhaust manifold temperature and the EGR coolant temperature; and determining the %EGR as a function of the first and second temperature values and the EGR system output temperature.

13. A method, as set forth in claim 9, wherein determining a mass airflow through the cylinder is determined as a function of a density of air at the intake manifold, a volumetric pumping efficiency of the engine, and a displacement of volume of air through the cylinder.

14. A method, as set forth in claim 13, wherein determining a mass airflow through the EGR valve includes the step of multiplying the mass airflow through the cylinder by the %EGR.

15. A method, as set forth in claim 9, wherein determining a manifold pressure differential includes the steps of:

measuring the pressure at the intake manifold;

determining the pressure at the exhaust manifold; and calculating the difference in pressure between the intake and exhaust manifolds.

16. A method, as set forth in claim 9, wherein determining a manifold pressure differential includes the steps of:

measuring the pressure at the intake manifold; and determining the manifold pressure differential as a function of the intake manifold pressure, the speed of the engine, and a rack position of a fuel injector system located on the engine.

17. A method, as set forth in claim 16, wherein determining the EGR flow coefficient includes the step of solving the equation $$K = \frac{\dot{m}_{EGR}}{\sqrt{\Delta P_{MAN}}}$$

where K is the EGR flow coefficient, $\dot{m}_{EGR}$ is the mass airflow through the EGR valve, and $\Delta P_{MAN}$ is the manifold pressure differential.

18. A method for determining a condition of an exhaust gas recirculation (EGR) system for an internal combustion engine, including the steps of:

holding an EGR valve located on the EGR system at a predetermined open position;

setting a cold side valve located on an intake side of the engine to a first predetermined position;

determining a responsive first temperature value at a first predetermined location;

setting the cold side valve to a second predetermined position;

determining a responsive second temperature value at the first predetermined location; and determining a condition of the EGR system as a function of a difference between the first and second temperature values.

19. A method, as set forth in claim 18, wherein the first predetermined position of the cold side valve is in a closed position.

20. A method, as set forth in claim 19, wherein the second predetermined position of the cold side valve is in a predetermined open position.

21. A method, as set forth in claim 18, wherein the first predetermined location for determining each temperature value is at an intake manifold located on the internal combustion engine.

* * * * *